United States Patent
Li et al.

(10) Patent No.: US 12,484,041 B2
(45) Date of Patent: Nov. 25, 2025

(54) DATA TRANSMISSION METHOD AND COMMUNICATION APPARATUS

(71) Applicant: HUAWEI TECHNOLOGIES CO., LTD., Shenzhen (CN)

(72) Inventors: Ruijie Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 17/854,498

(22) Filed: Jun. 30, 2022

(65) Prior Publication Data

US 2022/0338217 A1 Oct. 20, 2022

Related U.S. Application Data

(63) Continuation of application No. PCT/CN2019/129958, filed on Dec. 30, 2019.

(51) Int. Cl.
*H04W 72/1263* (2023.01)
*H04L 1/08* (2006.01)
*H04W 72/23* (2023.01)

(52) U.S. Cl.
CPC .......... *H04W 72/1263* (2013.01); *H04L 1/08* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2019/0149365 A1 | 5/2019 | Chatterjee et al. | |
| 2020/0053766 A1* | 2/2020 | Chien | H04L 5/0053 |
| 2020/0068416 A1* | 2/2020 | Kang | H04L 5/0053 |
| 2021/0092759 A1* | 3/2021 | Xiong | H04W 72/0446 |
| 2021/0160879 A1* | 5/2021 | Lin | H04W 72/0453 |
| 2022/0039136 A1* | 2/2022 | Takeda | H04W 72/23 |

FOREIGN PATENT DOCUMENTS

| | | |
|---|---|---|
| CN | 102143596 A | 8/2011 |
| CN | 103327615 A | 9/2013 |
| CN | 104823475 A | 8/2015 |
| CN | 106455095 A | 2/2017 |
| CN | 110535610 A | 12/2019 |
| EP | 2830378 A1 | 1/2015 |
| EP | 3518451 A1 | 7/2019 |

OTHER PUBLICATIONS

Huawei et al., "R1-155669 Further details of resource allocation for MTC UEs", 3GPP TSG RAN WG1 Meeting #82bis, Oct. 9, 2015, total 4 pages.

International Search Report issued in corresponding International Application No. PCT/CN2019/129958, dated Sep. 27, 2020, pp. 1-10.

Extended European Search Report issued in corresponding European Application No. 19958191.9, dated Nov. 14, 2022, pp. 1-7.

European Office Action issued in corresponding European Application No. 19958191.9, dated Feb. 6, 2025, pp. 1-6.

* cited by examiner

*Primary Examiner* — Anh Ngoc M Nguyen
(74) *Attorney, Agent, or Firm* — HAUPTMAN HAM, LLP

(57) ABSTRACT

A data transmission method includes obtaining indication information included on a downlink control channel. The indication information is useable to indicate a downlink data channel resource and an uplink data channel resource. The method further includes at least one of receiving data by the downlink data channel resource, or sending data by the uplink data channel resource.

17 Claims, 5 Drawing Sheets

DATA TRANSMISSION METHOD AND COMMUNICATION APPARATUS

CROSS-REFERENCE TO RELATED APPLICATIONS

This application is a continuation of International Application No. PCT/CN2019/129958, filed on Dec. 30, 2019, the disclosure of which is hereby incorporated by reference in its entirety.

TECHNICAL FIELD

This application relates to the field of communication technologies, and in particular, to a data transmission method and an apparatus.

BACKGROUND

The International Telecommunication Union (ITU) defines three typical services for a 5th generation (5G) mobile communication system: enhanced mobile broadband (eMBB), ultra-reliable low-latency communication (URLLC), and massive machine-type communications (mMTC). As one of the 5G services, URLLC imposes stricter requirements on reliability and a latency of a service. How to reduce a latency of a communication system and ensure reliability of the communication system is a concern in the URLLC field. Some application scenarios include self-driving, telemedicine, industrial internet of things (IIoT), and the like. Closed-loop application is a service application scenario of IIoT. In the closed-loop application, how a network device communicates with a terminal device is a researchtopic.

In some approaches, in a communication process, the network device sends, to the terminal device, a physical downlink control channel (PDCCH) carrying downlink control information (DCI). The DCI is used to indicate a resource for receiving or sending data by the terminal device. After receiving the PDCCH, on the resource indicated by the DCI, the terminal device sends a physical uplink shared channel (PUSCH) to the network device, or the terminal device receives a physical downlink shared channel (PDSCH) sent by the network device. However, when the terminal device sends the PUSCH or receives the PDSCH, the PDCCH is separately used for indication and scheduling. As a result, signaling overheads are high, a communication latency is high, and service quality suffers.

SUMMARY

One or more embodiments of this application provide a data transmission method and an apparatus, to resolve problems associated where signaling overheads are high, a communication latency is high, and service quality is hard to ensure in closed-loop data transmission.

According to a first aspect, one or more embodiments of this application provide a communication method. The method may be performed by a terminal device, or may be performed by a chip used in a terminal device. The following is described by using an example in which an execution body is the terminal device. The terminal device may obtain indication information on a downlink control channel, where the indication information is used to indicate a downlink data channel resource and an uplink data channel resource; and receives data by using the downlink data channel resource and/or sends data by using the uplink data channel resource. In the foregoing manner, when the terminal device communicates with a network device, the terminal device obtains the indication information carried on the downlink control channel, and the indication information may indicate the downlink data channel resource and the uplink data channel resource, so that a downlink data channel and an uplink data channel can be scheduled by using only one instruction, and no additional scheduling signaling is required. This effectively implements joint scheduling of the downlink data channel and the uplink data channel. For example, the downlink control channel may be a PDCCH, the downlink data channel may be a PDSCH, and the uplink data channel may be a PUSCH.

In some embodiments, there is a correspondence between the downlink data channel resource and the uplink data channel resource. For example, there is a one-to-one correspondence between the downlink data channel resource and the uplink data channel resource. For another example, the downlink data channel resource and the uplink data channel resource share an indicator field. In this manner, because there is the correspondence between the downlink data channel resource and the uplink data channel resource, the terminal device can obtain information about a channel resource provided that the terminal device obtains information about the other channel resource, so that the terminal device does not need to be notified of the other channel resource by using additional signaling. Therefore, control signaling overheads can be reduced, a transmission latency can be reduced, and system reliability of closed-loop transmission can be improved.

In some embodiments, the indication information may include first indication information and second indication information, the first indication information may be used to indicate the downlink data channel resource, and the second indication information may be used to indicate the uplink data channel resource.

In some embodiments, the second indication information may include one or more of a first indicator field, a second indicator field, or a third indicator field in downlink control information DCI. The first indicator field is used to indicate a slot offset of the uplink data channel. The slot offset may be a quantity of slots between a slot in which the downlink control channel is received and a slot in which a PUSCH corresponding to the downlink control channel is received, that is, may be k2 in a time domain resource table specified in a protocol; or may be a quantity of slots between a slot in which a PDSCH is scheduled and a slot in which a PUSCH is scheduled, where the PDSCH and the PUSCH are scheduled by a same downlink control channel. The second indicator field is used to indicate transmit power of the uplink data channel. The third indicator field may be used to indicate one or more items in a first set, and the first set includes a start symbol S and a length L of the uplink data channel on the time domain resource, an SLIV of the time domain resource, a mapping mode of the time domain resource, a quantity of repeated transmissions, an indication type of a frequency domain resource, a mapping mode of the frequency domain resource, a RIV of the frequency domain resource, a start RB and a quantity of occupied RBs of the frequency domain resource, or a bitmap of the frequency domain resource. In the foregoing manner, the first indication information and the second indication information in one instruction are used to respectively schedule the PDSCH and the PUSCH. Compared with some approaches in which PUSCH scheduling and PDSCH indication are performed by using two pieces of signaling, this manner can reduce scheduling signaling overheads, reduce a communication latency, and ensure service quality.

Specifically, the third indicator field is used to indicate an index of a row in a resource table, and each row in the resource table includes the index of the row and the one or more items in the first set.

In some embodiments, the second indication information includes one or more of a first indicator field, a second indicator field, or a third indicator field in downlink control information DCI, information about a bit occupied by one or more of the first indicator field, the second indicator field, or the third indicator field is used to indicate the uplink data channel resource, and the uplink data channel resource includes at least one of a time domain resource, a frequency domain resource, or transmit power. In the foregoing manner, a PUSCH resource and a PDSCH resource are indicated by using one piece of signaling. Compared with some approaches in which PUSCH scheduling and PDSCH indication are performed by using two pieces of signaling, this manner can reduce scheduling signaling overheads, reduce a communication latency, and ensure service quality.

In some embodiments, the second indication information includes one or more of a first indicator field, a second indicator field, or a third indicator field in downlink control information DCI. The first indicator field is used to indicate information about a time domain resource of the uplink data channel, and the information about the time domain resource includes at least one of the slot offset, a start symbol S and a length L of the time domain resource, an SLIV of the time domain resource, a mapping mode of the time domain resource, or a quantity of repeated transmissions. The second indicator field is used to indicate information about a frequency domain resource of the uplink data channel, and the information about the frequency domain resource includes one or more of an indication type of the frequency domain resource, a mapping mode of the frequency domain resource, a start RB and a quantity of occupied RBs of the frequency domain resource, a RIV of the frequency domain resource, or a bitmap of the frequency domain resource. The third indicator field is used to indicate transmit power. In the foregoing manner, a PUSCH resource and a PDSCH resource are indicated by using one piece of signaling. Compared with some approaches in which PUSCH scheduling and PDSCH indication are performed by using two pieces of signaling, this manner can reduce scheduling signaling overheads, reduce a communication latency, and ensure service quality.

In some embodiments, the DCI carried on the downlink control channel is not used to indicate an uplink control channel. In this solution, the DCI does not include a field indicating a PUCCH. For example, the downlink control channel in the DCI does not include a field used to indicate K1 (a slot offset from the PDSCH to the PUCCH that is used to feed back an ACK/a NACK and that corresponds to the PDSCH), indicate transmit power of the PUCCH, or indicate a PUCCH resource. In the foregoing manner, indicator fields in DCI signaling can be reduced, and signaling overheads can be reduced.

In some embodiments, after receiving the data by using the downlink data channel resource, the terminal device correctly decodes information carried on the downlink data channel, and does not send an ACK.

In some embodiments, after the terminal device receives the data by using the downlink data channel resource, if the terminal device does not correctly decode information carried on the downlink data channel, the terminal device does not send the data by using the uplink data channel resource, and does not send a NACK; or if the terminal device does not correctly decode information carried on the downlink data channel, the terminal device does not send a NACK. In the foregoing manner, signaling overheads of a HARQ feedback can be reduced, a communication latency can be reduced, and service quality can be ensured.

In some embodiments, after the terminal device receives the data by using the downlink data channel resource, if the terminal device unsuccessfully decodes the downlink data channel, the terminal device sends a first sequence by using the uplink data channel resource. In the foregoing manner, the terminal device implicitly indicates, by sending the first sequence, that the downlink data channel is unsuccessfully decoded, so that signaling overheads of a HARQ feedback can be reduced.

In some embodiments, after the terminal device receives the data by using the downlink data channel resource, if the downlink data channel is unsuccessfully decoded, the terminal device sends, by using the uplink data channel resource, data obtained through scrambling by using a first scrambling code. In the foregoing manner, the terminal device implicitly indicates, by sending the data scrambled by using the first scrambling code, that the downlink data channel is unsuccessfully decoded, so that signaling overheads of a HARQ feedback can be reduced.

In some embodiments, after the terminal device receives the data by using the downlink data channel resource, if the downlink data channel is successfully decoded, the terminal device sends, by using the uplink data channel resource, data scrambled by using a second scrambling code, where the first scrambling code is different from the second scrambling code. In the foregoing manner, the terminal device implicitly indicates, by sending the data scrambled by using the second scrambling code, that the downlink data channel is unsuccessfully decoded, so that signaling overheads of a HARQ feedback can be reduced.

According to a second aspect, one or more embodiments of this application provide a communication method. The method may be performed by a network device or a chip used in a network device. The following is described by using an example in which an execution body is the network device. The network device sends, to a terminal device, a downlink control channel carrying indication information, where the indication information may be used to indicate a downlink data channel resource and an uplink data channel resource; and the network device sends data by using the downlink data channel resource and/or receives data by using the uplink data channel resource. In the foregoing manner, the network device does not need to perform additional scheduling, scheduling signaling overheads are reduced, a communication latency is reduced, and service quality is ensured.

In some embodiments, there is a correspondence between the downlink data channel resource and the uplink data channel resource. For example, there is a one-to-one correspondence between the downlink data channel resource and the uplink data channel resource. For another example, the downlink data channel resource and the uplink data channel resource share an indicator field.

In some embodiments, the indication information includes first indication information and second indication information, the first indication information is used to indicate the downlink data channel resource, and the second indication information is used to indicate the uplink data channel resource.

In some embodiments, the second indication information includes one or more of a first indicator field, a second indicator field, or a third indicator field in downlink control information DCI. The first indicator field is used to indicate a slot offset of an uplink data channel. The second indicator field is used to indicate transmit power of the uplink data channel. The third indicator field is used to indicate one or more items in a first set, and the first set includes one or more of a start symbol S and a length L of the uplink data channel on the time domain resource, an SLIV of the time domain resource, a mapping mode of the time domain resource, a quantity of repeated transmissions, an indication type of a frequency domain resource, a mapping mode of the frequency domain resource, a start RB and a quantity of occupied RBs of the frequency domain resource, a RIV of the frequency domain resource, or a bitmap of the frequency domain resource.

In some embodiments, the third indicator field is used to indicate an index of a row in a resource table, and each row in the resource table includes the index of the row and the one or more items in the first set.

In some embodiments, the second indication information includes one or more of a first indicator field, a second indicator field, or a third indicator field in downlink control information DCI, information about a bit occupied by one or more of the first indicator field, the second indicator field, or the third indicator field is used to indicate the uplink data channel resource, and the uplink data channel resource includes at least one of a time domain resource, a frequency domain resource, or transmit power.

In some embodiments, the second indication information includes one or more of a first indicator field, a second indicator field, or a third indicator field in downlink control information DCI. The first indicator field is used to indicate information about a time domain resource of the uplink data channel, and the information about the time domain resource includes at least one of the slot offset, a start symbol S and a length L of the time domain resource, an SLIV of the time domain resource, a mapping mode of the time domain resource, or a quantity of repeated transmissions. The second indicator field is used to indicate information about a frequency domain resource of the uplink data channel, and the information about the frequency domain resource includes one or more of an indication type of the frequency domain resource, a mapping mode of the frequency domain resource, a RIV of the frequency domain resource, a bitmap of the frequency domain resource, or a start RB and a quantity of occupied RBs of the frequency domain resource. The third indicator field is used to indicate transmit power.

In some embodiments, the DCI carried on the downlink control channel is not used to indicate an uplink control channel.

In some embodiments, the network device receives a first sequence by using the uplink data channel resource, or the network device receives, by using the uplink data channel resource, data scrambled by using a first scrambling code, or the network device receives, by using the uplink data channel resource, data scrambled by using a second scrambling code, where the first scrambling code is different from the second scrambling code. In the foregoing manner, if the network device receives the first sequence, the data scrambled by using the first scrambling code, or the data scrambled by using the second scrambling code, it is equivalent to that the network device receives a NACK feedback/ an ACK feedback for downlink data. It can be learned that the first sequence, the data scrambled by using the first scrambling code, or the data scrambled by using the second scrambling code may implicitly indicate a HARQ feedback for the downlink data. This reduces HARQ signaling overheads, reduces a transmission latency, and ensures communication quality.

For beneficial effects of the example method in the second aspect, refer to beneficial effects of the example method in the first aspect. Details are not described herein again.

According to a third aspect, a communication apparatus is provided in one or more embodiments. For beneficial effects, refer to descriptions in the first aspect. Details are not described herein again. The communication apparatus has functions of implementing behaviors in the method example in the first aspect. The functions may be implemented by using hardware, or may be implemented by hardware executing corresponding software. The hardware or the software includes one or more modules corresponding to the foregoing functions. In some embodiments, the communication apparatus includes: a processing module, configured to obtain indication information on a downlink control channel, where the indication information is used to indicate a downlink data channel resource and an uplink data channel resource; and a transceiver module, configured to receive data by using the downlink data channel resource and/or send data by using the uplink data channel resource. These modules may perform corresponding functions in the method examples in the first aspect. For details, refer to detailed descriptions in the method examples. Details are not described herein again.

According to a fourth aspect, a communication apparatus is provided in one or more embodiments. For beneficial effects, refer to descriptions in the second aspect. Details are not described herein again. The communication apparatus has functions of implementing behaviors in the method example in the second aspect. The functions may be implemented by using hardware, or may be implemented by hardware executing corresponding software. The hardware or the software includes one or more modules corresponding to the foregoing functions. In some embodiments, the communication apparatus includes a transceiver module, configured to: send a downlink control channel carrying indication information, where the indication information is used to indicate a downlink data channel resource and an uplink data channel resource; and send data by using the downlink data channel resource and/or receive data by using the uplink data channel resource. In addition, the apparatus may further include a processing module, configured to determine the indication information. These modules may perform corresponding functions in the method examples in the second aspect. For details, refer to detailed description in the method examples. Details are not described herein again.

According to a fifth aspect, a communication apparatus is provided in one or more embodiments. The communication apparatus may be the terminal device in the foregoing method embodiments, or may be a chip disposed in the terminal device. The communication apparatus includes a communication interface and a processor. In some embodiments, the communication apparatus further includes a memory. The memory is configured to store a computer program or instructions. The processor is coupled to the memory and the communication interface. When the processor executes the computer program or the instructions, the communication apparatus is enabled to perform the methods performed by the terminal device in the foregoing method embodiments.

According to a sixth aspect, a communication apparatus is provided in one or more embodiments. The communication apparatus may be the network device in the foregoing method embodiments, or may be a chip disposed in the network device. The communication apparatus includes a communication interface and a processor. In some embodiments, the communication apparatus further includes a memory. The memory is configured to store a computer program or instructions. The processor is coupled to the memory and the communication interface. When the processor executes the computer program or the instructions, the communication apparatus is enabled to perform the methods performed by the network device in the foregoing method embodiments.

According to a seventh aspect, a computer program product is provided in one or more embodiments. The computer program product includes computer program code. When the computer program code is run, the methods performed by the terminal device in the foregoing aspects are performed.

According to an eighth aspect, a computer program product is provided in one or more embodiments. The computer program product includes computer program code. When the computer program code is run, the methods performed by the network device in the foregoing aspects are performed.

According to a ninth aspect, this application provides a chip system in one or more embodiments. The chip system includes a processor, configured to implement functions of the terminal device in the methods in the foregoing aspects. In some embodiments, the chip system further includes a memory, configured to store program instructions and/or data. The chip system may include a chip, or may include a chip and another discrete component.

According to a tenth aspect, this application provides a chip system in one or more embodiments. The chip system includes a processor, configured to implement functions of the network device in the methods in the foregoing aspects. In some embodiments, the chip system further includes a memory, configured to store program instructions and/or data. The chip system may include a chip, or may include a chip and another discrete component.

According to an eleventh aspect, this application provides a computer-readable storage medium in one or more embodiments. The computer-readable storage medium stores a computer program. When the computer program is run, the methods performed by the terminal device in the foregoing aspects are implemented.

According to a twelfth aspect, this application provides a computer-readable storage medium in one or more embodiments. The computer-readable storage medium stores a computer program. When the computer program is run, the methods performed by the network device in the foregoing aspects are implemented.

DESCRIPTION OF EMBODIMENTS

Figure 1:
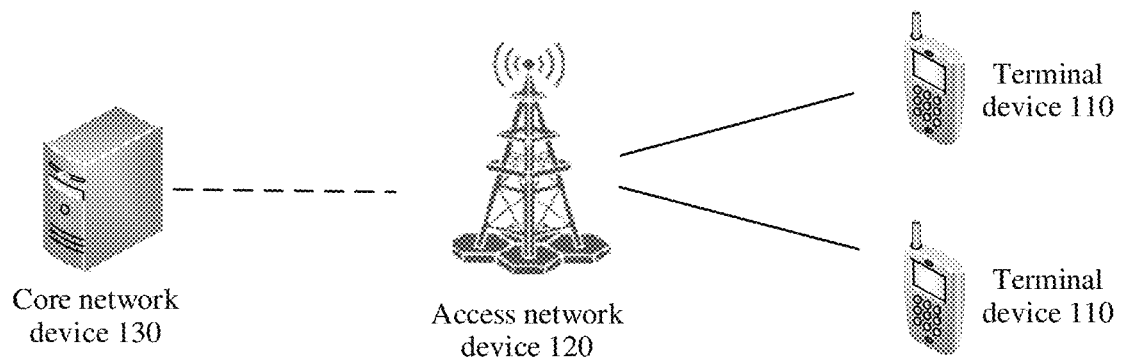
FIG. 1 is a schematic diagram of a possible communication architecture according to at least an embodiment of this application.

FIG. 1 is a schematic diagram of a possible network architecture to which an embodiment of this application is applicable. The network architecture includes a terminal device 110 and an access network device 120. The terminal device 110 and the access network device 120 may communicate with each other through a Uu air interface. The Uu air interface may be understood as a universal interface (a universal UE to network interface) between a terminal device and a network device. Transmission through the Uu air interface includes uplink transmission and downlink transmission.

For example, the uplink transmission means that the terminal device 110 sends uplink information to the access network device 120. The uplink information may include one or more of uplink data information, uplink control information, and a reference signal (RS). A channel for transmitting the uplink information may be referred to as an uplink channel. The uplink channel may be a physical uplink shared channel (PUSCH) or a physical uplink control channel (PUCCH). The PUSCH is used to carry uplink data, and the uplink data may also be referred to as uplink data information. The PUCCH is used to carry uplink control information (UCI) fed back by the terminal device. The UCI may include channel state information (CSI), an acknowledgement (ACK)/a negative acknowledgement (NACK), and the like.

For example, the downlink transmission means that the access network device 120 sends downlink information to the terminal device 110. The downlink information may include one or more of downlink data information, downlink control information, and a downlink reference signal. The downlink reference signal may be a channel state information reference signal (CSI-RS) or a phase tracking reference signal (PTRS). A channel for transmitting the downlink information may be referred to as a downlink channel. The downlink channel may be a physical downlink shared channel (PDSCH) or a physical downlink control channel (PDCCH). The PDCCH is used to carry downlink control information (DCI). The PDSCH is used to carry downlink data, and the downlink data may also be referred to as downlink data information.

In some embodiments, the network architecture shown in FIG. 1 may further include a core network device 130. The terminal device 110 may be connected to the access network device 120 in a wireless manner, and the access network device 120 may be connected to the core network device 130 in a wired or wireless manner. The core network device 130 and the access network device 120 may be different independent physical devices. Alternatively, the core network device 130 and the access network device 120 may be a same physical device, and all/some logical functions of the core network device 130 and the access network device 120 are integrated into the physical device.

It should be noted that, in the network architecture shown in FIG. 1, the terminal device 110 may be at a fixed position, or may be movable. This is not limited. In the network architecture shown in FIG. 1, another network device, for example, a wireless relay device and a wireless backhaul device, may be further included. This is not limited. In the architecture shown in FIG. 1, quantities of terminal devices, access network devices, and core network devices are not limited.

The technical solutions in embodiments of this application may be applied to various communication systems, for example, a long term evolution (LTE) system, a 5th generation (5G) mobile communication system, and a future mobile communication system.

The PDCCH carries scheduling and allocation information and other control information, and information carried on the PDCCH may be collectively referred to as the DCI. The foregoing transmission parameters may be a part of the DCI. Payload sizes of the DCI may be different in different scenarios. Consequently, formats of the DCI may be different, and resource sizes used to transmit the PDCCH may be different. For example, a payload size of the DCI for scheduling uplink data transmission may be different from that for scheduling downlink data transmission, a payload size of the DCI for scheduling single-stream downlink data transmission may be different from that for scheduling multi-stream downlink data transmission, and a payload size of the DCI for scheduling an eMBB service may be different from that for scheduling a URLLC service.

To enhance an error detection capability of the terminal device for the DCI, the network device performs cyclic redundancy code (CRC) check on the DCI, to generate a corresponding CRC. To distinguish DCI in different scenarios, for different purposes, and in different formats, the network device scrambles the CRC by using different radio network temporary identifiers (RNTIs). The scrambled CRC and the DCI are channel coded and modulated, and then are mapped to the PDCCH and sent to the terminal device.

In this application, the format of the DCI includes the payload size of the DCI, the RNTI, and definitions of fields included in the DCI. That payload sizes (payload sizes) of the DCI are different may be considered as that formats of the DCI are different. That RNTIs for scrambling are different may also be considered as that formats of the DCI are different. That the definitions of the fields included in the DCI are different may also be considered as that the formats of the DCI are different. The definition of the field herein may include a position of the field in the DCI, a bit length of the field, and a specific meaning indicated by the field. The payload size herein may be a total quantity of bits of the fields in the DCI, or may be a total quantity of bits of the fields in the DCI plus a length of the CRC.

In this application, the DCI has the following several formats: Format 0-0, Format 0-1, Format 1-0, Format 1-1, Format 2-0, Format 2-1, Format 2-2, and Format 2-3. Four formats Format 0-0, Format 0-1, Format 1-0 and Format 1-0 are used for data channel indication and scheduling. Specifically, Format 0-0 and Format 0-1 are used for uplink data channel scheduling, and Format 1-0 and Format 1-1 are used for downlink data channel indication. Format 0-0 is used for PUSCH scheduling, and is a fallback mode and is used in scenarios such as waveform change and state switching. Specifically, Format 0-0 indicates a scheduled PUSCH time-frequency resource position, an MCS, a HARQ indicator, and PUCCH power control. Format 0-1 is a normal mode for PUSCH scheduling, and includes a carrier indicator, a BWP indicator, a scheduled time-frequency resource position, a frequency hopping indicator, an MCS, a HARQ indicator, an SRS resource indicator, precoding information, an antenna port, a waveform indicator, and the like. Format 1-0 is used for PDSCH indication, and is a fallback mode and is used for common message scheduling and state transition. Format 1-1 is a normal mode for PDSCH indication, and includes information such as a carrier indicator, a BWP indicator, a scheduled time-frequency resource position, an MCS, a HARQ indicator, an antenna port, and precoding information.

Currently, a process in which the terminal device determines a time domain resource for sending data to the network device (namely, uplink transmission) or determines a time domain resource for receiving data sent by the network device (namely, downlink transmission) mainly includes:

First, the terminal device determines a time domain resource table. The time domain resource table may include a parameter S and a parameter L, S represents a start (start) symbol (or a number of a start symbol) of a data channel, and L (length) represents a quantity of symbols occupied by the data channel. Then, the terminal device receives indication information sent by the network device. The indication information is used to indicate a row in the time domain resource table, or the indication information may be used to indicate a start and length indicator value (SLIV) obtained by jointly encoding S and L in the time domain resource table. The time domain resource table may include the SLIV. The terminal device may determine a time domain resource based on the row or the SLIV indicated by the network device in the time domain resource table.

The following describes in detail the process in which the terminal device determines the time domain resource for sending data to the network device or determines the time domain resource for receiving data sent by the network device.

First, the terminal device determines a time domain resource table. The time domain resource table may be a time domain resource table specified in a protocol or a time domain resource table configured by using higher layer signaling.

The time domain resource table specified in the protocol includes 16 rows, and for uplink transmission, each row includes:

a parameter S, a parameter L, a parameter K2 or K0, and a physical downlink shared channel (PDSCH) mapping type (mapping type) or a physical uplink shared channel (PUSCH) mapping type (mapping type).

S represents a number of a start (start) symbol of a data channel, and S uses a slot boundary as a reference. L (length) represents a quantity of symbols occupied by the data channel, and may also be referred to as a quantity of consecutive symbols of the data channel, or may also be referred to as a time domain length of the data channel. L is the quantity of consecutive symbols starting from S. In the time domain resource table, a time domain resource determined based on S and L is definitely in a slot, and a time domain resource does not cross a slot boundary.

The parameter K2 exists only in the time domain resource table of uplink transmission, and the parameter K0 exists only in the time domain resource table of downlink transmission. In other words, the protocol specifies respective time domain resource tables for the uplink transmission and the downlink transmission. K2 represents a quantity of slots between a slot in which a physical downlink control channel (PDCCH) is received and a slot in which a physical uplink shared channel (PUSCH) is sent. K0 represents a quantity of slots between a slot in which a PDCCH is received and a slot in which a physical downlink shared channel (PDSCH) is sent.

The PDSCH mapping type is mainly used to determine a time domain symbol position of a demodulation reference signal (DMRS) of the PDSCH, and may further be used to determine all appropriate start positions, appropriate duration, and the like of the PDSCH. There are two types of PDSCH mapping: a type A (type A) and a type B (type B). The type A indicates that a position of the first DMRS is in the third or fourth symbol of a slot, and the type B indicates that a position of the first DMRS is in the first symbol in which data starts.

The PUSCH mapping type is mainly used to determine a time domain symbol position of a demodulation reference signal (DMRS) of the PUSCH, and may further be used to determine all appropriate start positions, appropriate duration, and the like of the PUSCH. There are two types of PUSCH mapping: a type A (type A) and a type B (type B). The type A indicates that a position of the first DMRS is in the third or fourth symbol of a slot, and the type B indicates that a position of the first DMRS is in the first symbol in which data starts.

The time domain resource table configured by using higher layer signaling has a maximum of 16 rows, and each row includes the following parameters:
 an SLIV, a parameter K2 or K0, and a PDSCH mapping type (mapping type) or a PUSCH mapping type (mapping type).

The SLIV value is a result obtained by jointly encoding S and L. The SLIV, S, and L satisfy the following mapping relationship:
 If $(L-1) \leq 7$, $SLIV=14*(L-1)+S$; otherwise
 $SLIV=14*(14-L+1)+(14-1-S)$, where $0 < L \leq (14-S)$.

In this application, the mapping relationship is referred to as a mapping relationship (1). A value of S ranges from 0 to 13. With reference to the foregoing mapping relationship (1), it can be learned that the time domain resource determined based on S and L does not cross a slot boundary. According to the foregoing mapping relationship (1), one SLIV value may uniquely determine one combination of the value of S and the value of L, and one combination of the value of S and the value of L may also uniquely determine one SLIV value.

Definitions of the parameter K2, the parameter K0, the PDSCH mapping type, and the PUSCH mapping type are similar to definitions of those in the time domain resource table specified in the protocol, and are not described herein again.

After determining a time domain resource table, for example, after using a time domain resource table specified in a protocol,
 the terminal device receives a PDCCH sent by the network device. The PDCCH carries downlink control information (DCI). The DCI includes a field whose length is X bits (bits). The field is used to indicate a row in the time domain resource table, to indicate a start symbol S and a length L of a data channel. The terminal device may alternatively receive higher layer signaling sent by the network device. The higher layer signaling indicates a row in the time domain resource table, that is, indicates a start symbol S and a length L of a data channel.

For another example, after receiving the time domain resource table configured by using the higher layer signaling, the terminal device further receives a PDCCH sent by the network device or higher layer signaling sent by the network device. The PDCCH or the higher layer signaling is used to indicate a row in the time domain resource table configured by using the higher layer signaling. According to the foregoing descriptions, each row in the time domain resource table includes one SLIV value, and the SLIV may be determined based on the foregoing mapping relationship (1). The terminal device determines S and L based on the SLIV value, and then may determine the position of the time domain resource based on S and L.

According to the foregoing method, the terminal device may determine the start symbol and the quantity of symbols of the time domain resource of the data channel. Then, data is sent to the network device on the time domain resource or data sent by the network device is received on the time domain resource. A method for determining, by the network device, the start symbol and the quantity of symbols of the time domain resource of the data channel is similar to the foregoing method.

However, regardless of whether the terminal device receives the downlink data channel or the terminal device sends the uplink data channel, the downlink data channel is indicated and the uplink data channel is scheduled separately through the downlink control channel. That is, the downlink data channel is indicated or the uplink data channel is scheduled independently by using different signaling. Consequently problems that signaling overheads are high, a communication latency is high, and service quality cannot be ensured are caused.

Based on the foregoing descriptions, this application provides a communication method. A principle of the method is as follows: A downlink data channel and an uplink data channel are jointly scheduled through a downlink control channel Because scheduling is performed in this manner, the terminal device does not need to separately obtain indication information of the downlink control channel, to perform downlink data channel indication and uplink data channel scheduling. In this way, signaling overheads of entire closed-loop application are reduced, and a service latency is ensured.

The following explains and describes some nouns or terms used in this application, and the nouns or terms are also used as a part of content of the present disclosure.
1. Terminal Device The terminal device may be a terminal for short or may be referred to as user equipment (UE), and is a device having a wireless transceiver function. The terminal device may be deployed on land, including an indoor or outdoor device, a handheld device, or a vehicle-mounted device, or may be deployed on a water surface (for example, on a ship), or may be deployed in air (for example, on a plane, an unmanned aerial vehicle, a balloon, and a satellite). The terminal device may be a mobile phone, a tablet computer, a computer having a wireless transceiver function, a virtual-reality terminal device, an augmented-reality terminal device, a wireless terminal in industrial control, a wireless terminal in self-driving, a wireless terminal in telemedicine, a wireless terminal in a smart grid, a wireless terminal in transportation safety, a wireless terminal in a smart city, or a wireless terminal in a smart home. The terminal device may be fixed or movable. This is not limited in embodiments of this application.

In embodiments of this application, an apparatus configured to implement a function of a terminal may be a terminal device, or may be an apparatus, for example, a chip system, that can support the terminal device to implement the function. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which an apparatus configured to implement a function of a terminal device is the terminal device.

2. Network Device

The network device may be an access network device. The access network device may also be referred to as a radio access network (RAN) device, and is a device that provides a wireless communication function for a terminal device. The access network device includes, for example, but is not limited to, a next generation NodeB (gNB), an evolved NodeB (eNB), a baseband unit (BBU), a transmission reception point (TRP), or a transmission point (TP) in 5G, a base station in a future mobile communication system, or an access point in a Wi-Fi system. Alternatively, the access network device may be a radio controller, a centralized unit (CU), and/or a distributed unit (DU) in a cloud radio access network (CRAN) scenario, or the network device may be a relay station, a vehicle-mounted device, a network device in a future evolved PLMN network, or the like.

The terminal device may communicate with a plurality of access network devices using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this application.

In embodiments of this application, an apparatus configured to implement a function of a network device may be the network device, or may be an apparatus, for example, a chip system, that can support the network device to implement the function. The apparatus may be installed in the network device. In the technical solutions provided in embodiments of this application, the technical solutions provided in embodiments of this application are described by using an example in which an apparatus configured to a function of a network device is the network device.

3. Higher Layer Signaling

The higher layer signaling may be signaling sent by a higher-layer protocol layer. The higher-layer protocol layer is at least one protocol layer above a physical layer. For example, the higher-layer protocol layer may include at least one of the following: a media access control (MAC) layer, a radio link control (RLC) layer, a packet data convergence protocol (PDCP) layer, a radio resource control (RRC) layer, and a non-access stratum (NAS).

4. Joint Scheduling

The joint scheduling is different from independent indication and independent scheduling of a downlink data channel and an uplink data channel in some approaches. In some approaches, a downlink data channel is indicated by using one piece of indication information, and an uplink data channel is scheduled by using another piece of indication information. The joint scheduling refers to scheduling a downlink data channel and an uplink data channel by using one piece of indication information.

5. Frequency Domain Resource

The frequency domain resource specifically means that a frequency domain resource used for wireless communication between a network device and a terminal device may be divided into a plurality of frequency domain resources. In addition, the plurality of frequency domain resources may be consecutive, or a preset interval may be set between some adjacent frequency domain resources. This is not particularly limited in embodiments of this application. The frequency domain resource may be a virtual resource block (VRB), or may be a physical resource block (PRB). There is a correspondence between the virtual resource block and the physical resource block. There are two types of frequency domain resource indication for a PDSCH and a PUSCH: a type 0 (Type 0) and a type 1 (Type 1). The type 0 is at a granularity of a resource block group (RBG), and the type 1 is at a granularity of a virtual resource block (VRB). The RBG refers to a group of consecutive virtual resource blocks. A size of an RBG is related to a bandwidth.

For the type 0, resources of the PDSCH and the PUSCH are represented by using a bitmap (bitmap), and each resource block group (Resource Block Group) corresponds to one bit. For the type 1, resources of the PDSCH and the PUSCH are indicated by using a resource indicator value (resource indication value, RIV), and includes a quantity of continuously occupied RBs ($L_{RBs}$) and a start RB ($RB_{start}$) that are obtained through joint coding. Specifically, the RIV is calculated in the following manner:

If $(L_{RBs}-1) \le \lfloor N_{BWP}^{size}/2 \rfloor$, $RIV = N_{BWP}^{size}(L_{RBs}-1) + RB_{start}$; otherwise $RIV = N_{BWP}^{size}(N_{BWP}^{size} - L_{RBs} + 1) + (N_{BWP}^{size} - 1 - RB_{start})$, where $N_{BWP}^{size}$ represents a BWP size, $RB_{start}$ represents the start RB, and $L_{RBs}$ represents the quantity of continuously occupied RBs.

A mapping mode from the virtual resource block to the physical resource block may be interleaved mapping and non-interleaved mapping.

6. Time Domain Resource

The time domain resource may also be referred to as a time unit or a time domain symbol, and specifically means that a time domain resource used for wireless communication between a base station and a terminal device may be divided into a plurality of time domain resources. In addition, the plurality of time domain resources may be consecutive, or a preset interval may be set between some adjacent time domain resources. This is not particularly limited in embodiments of this application. A length of one time domain resource is not limited. For example, one time domain resource may be one or more subframes, or may be one or more slots, or may be one or more symbols. The symbol is also referred to as a time domain symbol, and may be an orthogonal frequency division multiplexing (OFDM) symbol or a single carrier frequency division multiple access (SC-FDMA) symbol, where SC-FDMA is also referred to as orthogonal frequency division multiplexing with transform precoding (OFDM with TP). There is a time sequence relationship between the plurality of time domain resources in time domain, and time lengths corresponding to any two time domain resources may be the same or may be different. For example, the time domain resource may include one or more of a start symbol S and a length L of the time domain resource, a start and length indicator value SLIV of the time domain resource, a mapping mode of the time domain resource, or a quantity of repeated transmissions.

In embodiments of this application, terms such as "first" and "second" are merely used for distinguishing and description, but cannot be understood as indicating or implying relative importance, or cannot be understood as indicating or implying a sequence. The term "at least one" means one or more, and the term "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" usually represents an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a and b and c, where a, b, and c may be singular items (pieces) or plural items (pieces).

It should be particularly emphasized that a slot (slot) in this application may be a mini-slot, or may be another time unit. This is not specifically limited in the present disclosure. A downlink control channel in this application may be a PDCCH, or may be a new downlink control channel. This is not specifically limited in this application.

Figure 2:
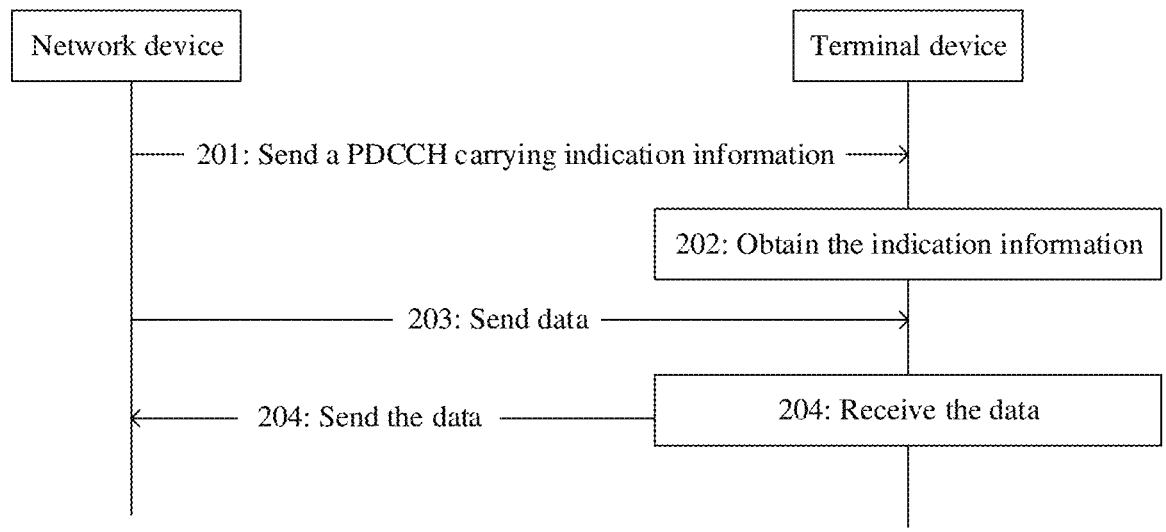
FIG. 2 is a schematic diagram of a possible communication method according to at least an embodiment of this application.

As shown in FIG. 2, an embodiment of this application provides a schematic flowchart of a communication method. The method may be performed by a terminal device and a network device, or may be performed by a chip in a terminal device and a chip in a network device. The network device in FIG. 2 may be the access network device 120 in FIG. 1, and the terminal device may be the terminal device 110 in FIG. 1. The method shown in FIG. 4 may include the following operations.

S201: The network device sends a downlink control channel to the terminal device, where the downlink control channel carries indication information, and the indication information is used to indicate a downlink data channel resource and an uplink data channel resource.

For example, the indication information may be carried in downlink control information DCI.

For example, an uplink data channel may be a PUSCH, and a downlink data channel may be a PDSCH.

For example, the downlink data channel resource includes one or more of a time domain resource, a frequency domain resource, or transmit power.

For example, the uplink data channel resource includes one or more of a time domain resource, a frequency domain resource, or transmit power.

S202: The terminal device obtains the indication information on the downlink control channel.

For example, before the terminal device obtains the indication information, the terminal device needs to receive the downlink control channel, and successfully decode the indication information carried on the downlink control channel.

S203: The network device sends data by using the downlink data channel resource.

S204: The terminal device receives data by using the downlink data channel resource and/or sends data by using the uplink data channel resource.

Figure 3:
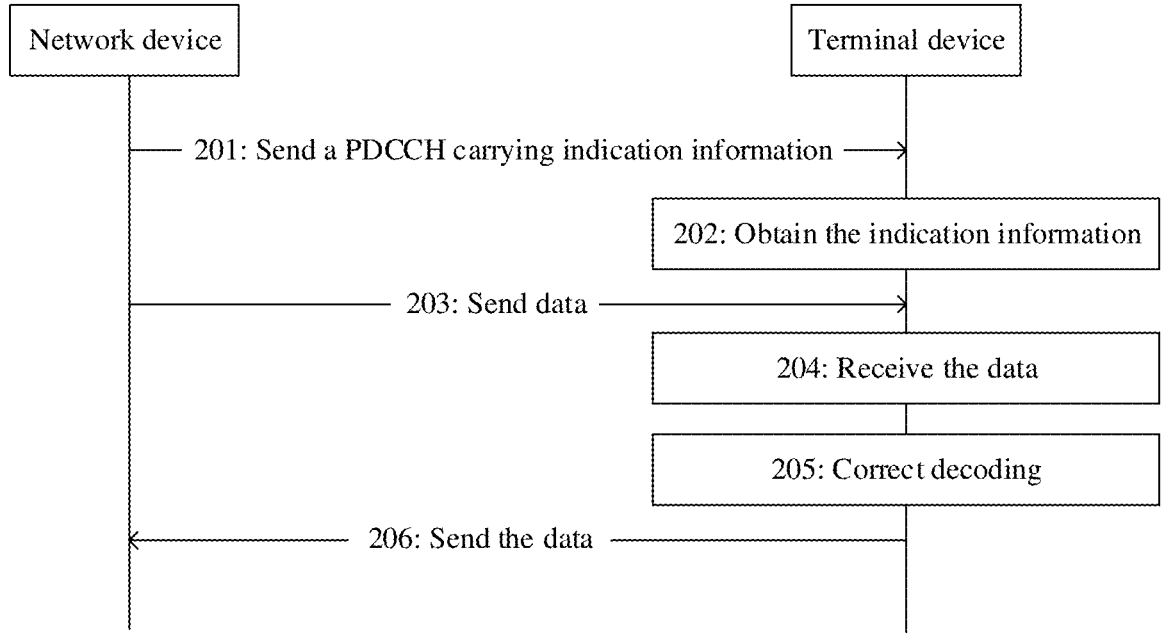
FIG. 3 is a schematic diagram of another possible communication method according to at least an embodiment of this application.

An example of S204 may be as follows: As shown in FIG. 3, S204: Receive the data by using the downlink data channel resource. S205: The terminal device needs to correctly decode information carried on the downlink data channel, and does not send an ACK. S206: Only the terminal device can send the data by using the uplink data channel resource. Correspondingly, the network device receives the data on the uplink data channel resource.

An example of S204 may be that the terminal device receives the data by using the downlink data channel resource. If the terminal device does not correctly decode the information carried on the downlink data channel, the terminal device does not send the data by using the uplink data channel resource, and does not send a NACK to the network device either.

Another example of S204 may be that the terminal device receives the data by using the downlink data channel resource. If the terminal device does not correctly decode the information carried on the downlink data channel, the terminal device does not send a NACK to the network device.

Figure 4:
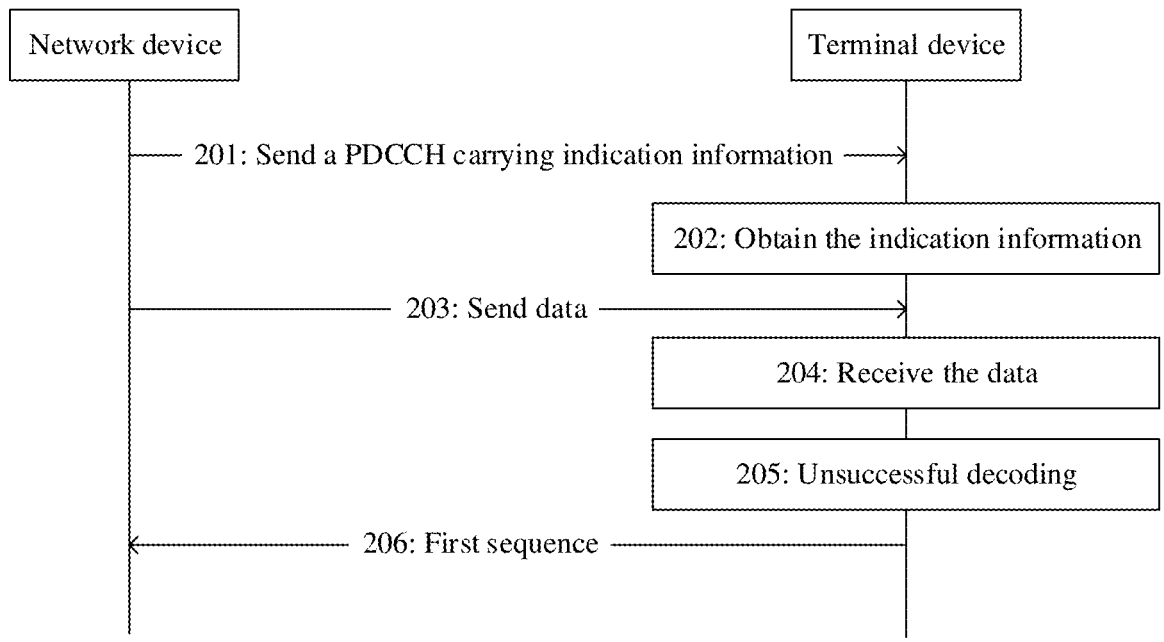
FIG. 4 is a schematic diagram of another possible communication method according to at least an embodiment of this application.

Another example of S204 may be as follows: As shown in FIG. 4, S204: The terminal device receives the data by using the downlink data channel resource. S205: The terminal device unsuccessfully decodes information carried on the downlink data channel. S206: Send a first sequence by using the uplink data channel resource. Correspondingly, the network device receives the first sequence. For example, the first sequence is used to notify the network device that the downlink data is unsuccessfully decoded. For example, the first sequence may be a demodulation reference signal (DMRS) sequence.

Figure 5:
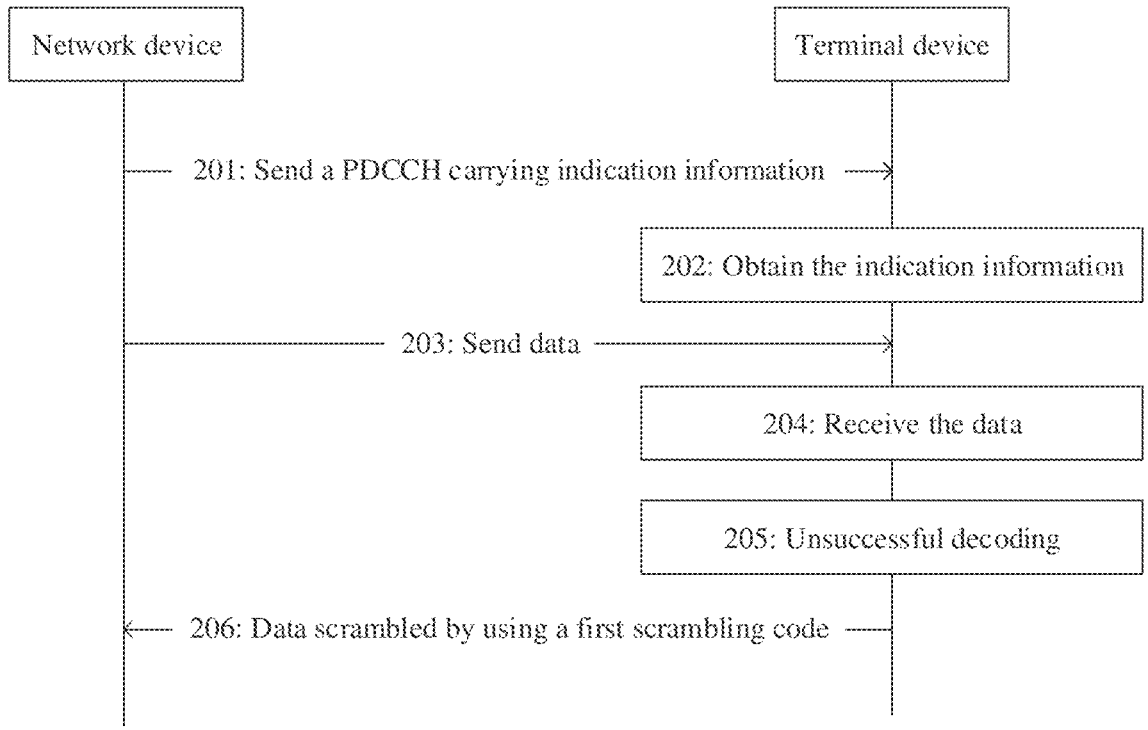
FIG. 5 is a schematic diagram of another possible communication method according to at least an embodiment of this application.

Another example of S204 may be as follows: As shown in FIG. 5, S204: Receive the data by using the downlink data channel resource. S205: The terminal device unsuccessfully decodes information carried on the downlink data channel S206: The terminal device sends, by using the uplink data channel resource, data scrambled by using a first scrambling code. Correspondingly, the network device receives, by using the uplink data channel resource, the data scrambled by using the first scrambling code.

Figure 6:
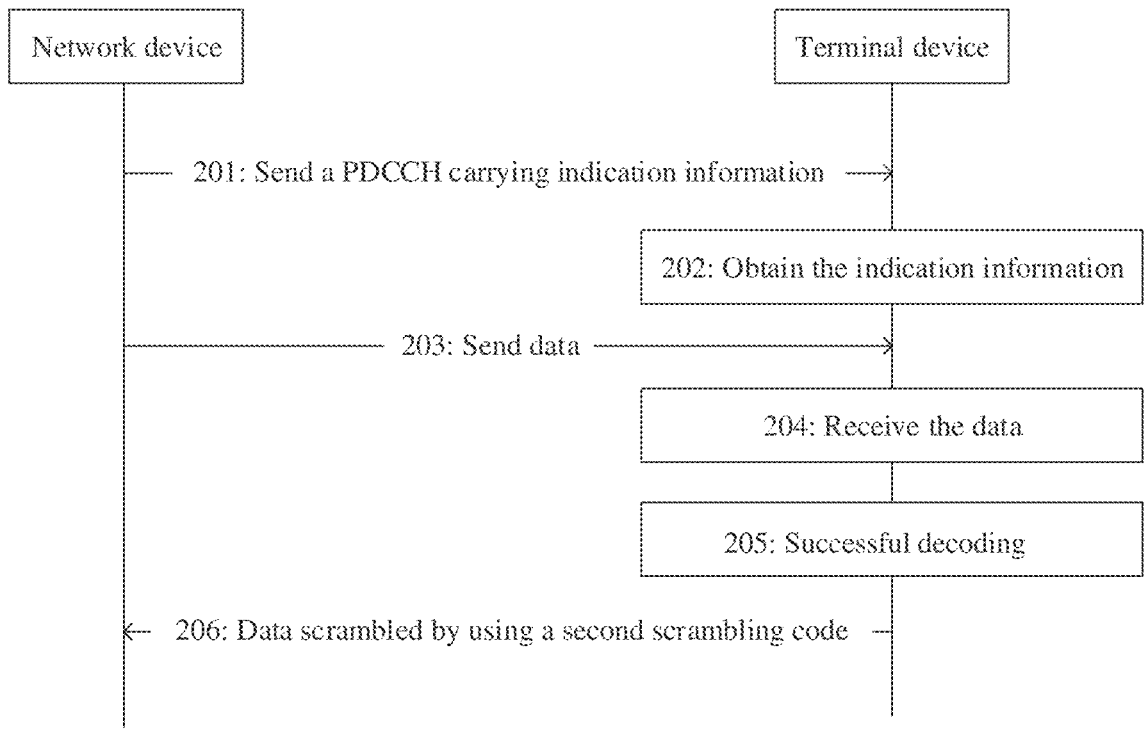
FIG. 6 is a schematic diagram of another possible communication method according to at least an embodiment of this application.

Another example of S204 may be as follows: As shown in FIG. 6, S204: Receive the data by using the downlink data channel resource. S205: The terminal device successfully decodes information carried on the downlink data channel S206: The terminal device sends, by using the uplink data channel resource, data scrambled by using a second scrambling code. Correspondingly, the network device receives, by using the uplink data channel resource, the data scrambled by using the second scrambling code.

It should be particularly emphasized that the first scrambling code is different from the second scrambling code.

It can be learned from the foregoing that, in this embodiment of this application, the terminal device obtains the indication information on the downlink control channel, where the indication information is used to indicate the downlink data channel resource and the uplink data channel resource; and communicates with the network device by using the downlink data channel resource and the uplink data channel resource. The PDSCH and PUSCH are jointly scheduled on the downlink control channel, so that signaling overheads of entire closed-loop application are reduced, a communication latency is reduced, and service quality is ensured.

It should be noted that an execution sequence of S201 to S204 in FIG. 2 is merely an example for description, and is not intended to limit this application. For example, S203 may be performed before S202.

Figure 7:
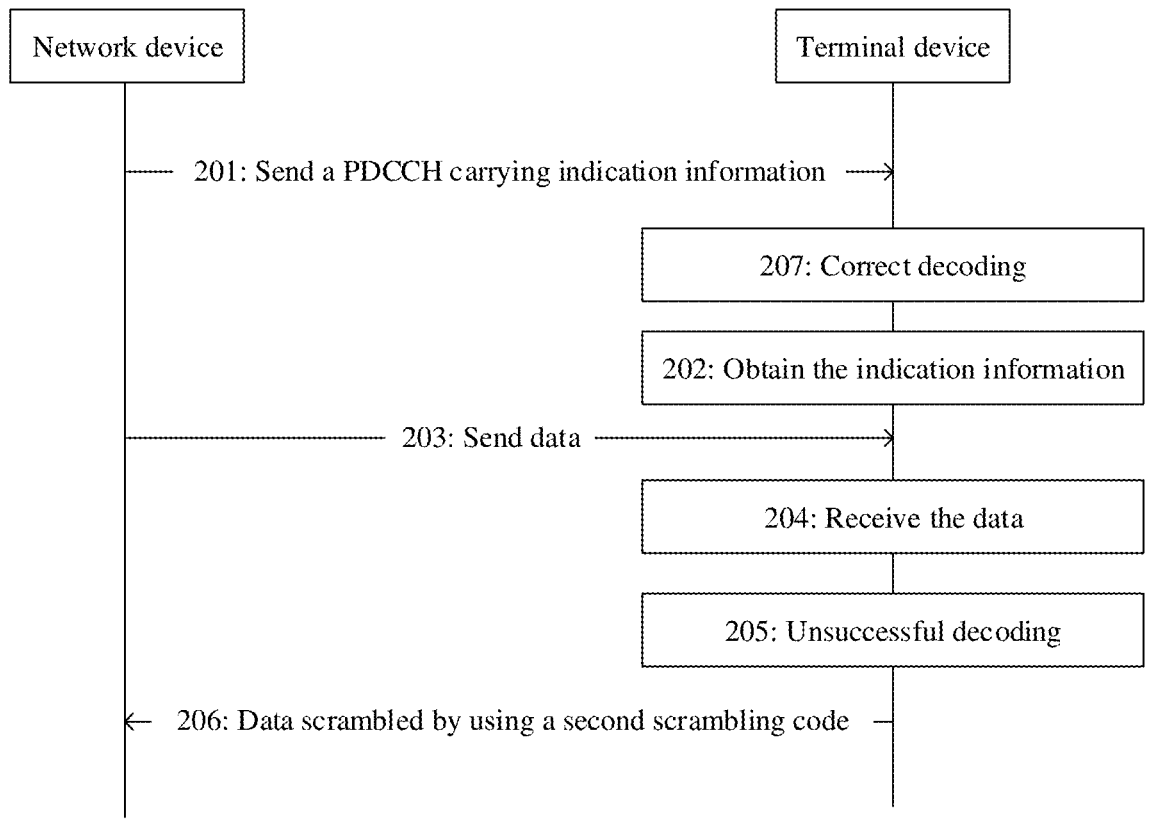
FIG. 7 is a schematic diagram of another possible communication method according to at least an embodiment of this application.

FIG. 7 shows another embodiment according to this application. This embodiment is similar to the embodiment shown in FIG. 2. A difference lies in that after step S201 and before step 202, the method further includes S207: The terminal device correctly decodes the indication information carried on the downlink control channel. In an example of this application, the terminal device correctly decodes the indication information carried on the downlink control channel, and the terminal device does not send the ACK to the network device. In this manner, signaling overheads of a HARQ feedback can be reduced.

A specific implementation of S201 and S202 is as follows:

The indication information may include first indication information and second indication information, the first indication information is used to indicate the downlink data channel resource, and the second indication information is used to indicate the uplink data channel resource.

It should be particularly emphasized that there is no sequence for obtaining the first indication information and the second indication information. The first indication information may be obtained before the second indication information, or the second indication information may be obtained before the first indication information, or the first indication information and the second indication information may be obtained at the same time.

In a representation form, there is a correspondence between the downlink data channel resource and the uplink data channel resource.

For example, the correspondence between the downlink data channel resource and the uplink data channel resource may be configured by using higher layer signaling.

For example, the correspondence means that one downlink data channel resource corresponds to one uplink data channel resource. In other words, when one downlink data channel resource is determined based on the indication information on the downlink control channel, one uplink data channel resource is also determined.

Specifically, the downlink data channel resource includes one or more of a time domain resource of the downlink data channel, a frequency domain resource of the downlink data channel, or power.

For example, the time domain resource of the downlink data channel may include one or more of K0, an SLIV of the time domain resource, a start symbol S and a quantity L of occupied symbols of the time domain resource, a mapping relationship of the time domain resource, or a quantity of repetitions. A frequency domain resource of the uplink data channel may include one or more of K0, an SLIV of a time domain resource, a start symbol S and a quantity L of occupied symbols of the time domain resource, a mapping relationship of the time domain resource, or a quantity of repetitions. The correspondence is that K0 in the time domain resource of the downlink data channel corresponds to K0 in the frequency domain resource of the uplink data channel, or may be that the start symbol S and the quantity L of occupied symbols of the time domain resource of the downlink data channel, the mapping relationship of the time domain resource, and the quantity of repetitions correspond to the start symbol S and the quantity L of occupied symbols of the time domain resource of the uplink data channel, the mapping relationship of the time domain resource, and the quantity of repetitions. These are merely examples for ease of understanding of the correspondence in this embodiment of the present disclosure. The present disclosure includes but is not limited this. Any technical solution that can reflect the correspondence between the downlink data channel resource and the uplink data channel resource falls within the protection scope of the present disclosure.

In this manner, because there is the correspondence between the downlink data channel resource and the uplink data channel resource, the terminal device can obtain information about a channel resource provided that the terminal device obtains information about the other channel resource, so that the terminal device does not need to be notified of the other channel resource by using additional signaling. Therefore, control signaling overheads can be reduced, a transmission latency can be reduced, and system reliability of closed-loop transmission can be improved.

For example, the correspondence may alternatively be reflected in a form of a first resource table, and each row in the first resource table may include an index, a downlink data channel resource, and an uplink data channel resource. For example, when the downlink data channel resource is determined as a downlink data channel resource corresponding to an index 1, the corresponding uplink data channel resource is determined as an uplink data channel resource corresponding to the index 1.

Further, each row in the first resource table may alternatively include only the uplink data channel resource and the downlink data channel resource, and the indication information may be used to indicate content of a row in the first resource table.

For example, the correspondence may be that frequency mapping of uplink data is consistent with frequency mapping of downlink data. That is, when interleaved mapping is used for the downlink data, interleaved mapping is also used for the uplink data. Alternatively, the correspondence may be that frequency mapping of the uplink data is different from frequency mapping of the downlink data. That is, when interleaved mapping is used for the downlink data, non-interleaved mapping is used for the uplink data.

For example, a time domain resource of a PDSCH and a time domain resource of a PUSCH are used as an example to describe the correspondence. Information about the time domain resource of the PDSCH includes at least one or more of K0, an SLIV of the time domain resource, a start symbol S and a quantity L of occupied symbols of the time domain resource, a mapping relationship of the time domain resource, or a quantity of repetitions. Information about the time domain resource of the PUSCH includes at least one or more of K2, an SLIV of the time domain resource, a start symbol S and a quantity L of occupied symbols of the time domain resource, a mapping relationship of the time domain resource, or a quantity of repetitions. The correspondence means that one piece of information about the time domain resource of the PDSCH corresponds to one piece of information about the time domain resource of the PUSCH. For example, K0 in the PDSCH corresponds to K2 in the PUSCH. For another example, K0 and the SLIV in the PDSCH correspond to K2 and the SLIV in the PUSCH. For brevity, examples are not used for description one by one. Any technical solution that can reflect the correspondence between the downlink data channel resource and the uplink data channel resource falls within the protection scope of this application.

For example, after determining a second resource table, the terminal device receives the downlink control channel sent by the network device by using, for example, the resource table specified in the protocol, where the correspondence between the uplink data channel resource and the downlink data channel resource is specified in the second resource table. The indication information carried on the downlink control channel may indicate a row in the second resource table or indicate an index of a row, to indicate the uplink data channel resource and the downlink data channel resource. Alternatively, the terminal device may receive higher layer signaling sent by the network device. The higher layer signaling is used to indicate a row or an index of a row in the second resource table, that is, indicate the uplink data channel resource and the downlink data channel resource.

In a representation form, the downlink data channel resource and the uplink data channel resource share an indicator field.

For example, for ease of understanding, each row in a third resource table includes an index indicator field, the downlink data channel resource, and the uplink data channel resource. The indication information is used to indicate the index indicator field shared by the downlink data channel resource and the uplink data channel resource, that is, may indicate the downlink data channel resource and the uplink data channel resource. In another representation form, the downlink data channel resource may alternatively be reflected by using a fourth resource table, that is, each row in the fourth resource table includes an index indicator field and the downlink data channel resource. The uplink data channel resource may alternatively be reflected by using a fifth resource table, that is, each row in the fifth resource table includes an index indicator field and the uplink data channel resource. The indication information is used to indicate a same index indicator field of the downlink data channel resource and the uplink data channel resource. It is assumed that the common indicator field is an index 1. To be specific, the indication information indicates a downlink data channel resource, indicated by the first row in the fourth resource table, corresponding to the index 1 and an uplink data channel resource, indicated by the first row in the fifth resource table, corresponding to the index 1.

For better understanding of this solution, a time domain resource is used as an example. A sixth resource table may include an index indicator field, a time domain resource of an uplink data channel, and a time domain resource of a downlink data channel. The indication information may be used to indicate an index of a row in the sixth resource table, so that the downlink data channel resource and the uplink data channel resource can be determined. For another example, a seventh resource table may include an index indicator field and a time domain resource of an uplink data channel, and an eighth resource table includes an index indicator field and a time domain resource of a downlink data channel. The indication information is used to indicate an index of the second row in the index indicator field. To be specific, it is determined that the uplink data channel resource is content of the second row in the seventh resource table, and the downlink data channel resource is content of the second row in the eighth resource table. Specifically, for content included in the uplink data channel resource and the downlink data channel resource, refer to the foregoing descriptions. Details are not described herein again.

In a representation form, the DCI carried on the downlink control channel is not used to indicate an uplink control channel. In this solution, the DCI does not include a field indicating a PUCCH. For example, the downlink control channel in the DCI does not include a field used to indicate K1 (a slot offset from the PDSCH to the PUCCH that is used to feed back an ACK/a NACK and that corresponds to the PDSCH), indicate transmit power of the PUCCH, or indicate a PUCCH resource.

Specifically, it is assumed that a fourth indicator field in the DCI may correspond to a PDSCH-to-HARQ_feedback timing indicator field in DCI Format 1-0 and/or Format 1-1 in some approaches, and is not used to indicate K1; a fifth indicator field may correspond to a TPC command for scheduled PUCCH indicator field in DCI Format 1-0 and/or Format 1-1 in some approaches, and is not used to indicate the transmit power of the PUCCH; and a sixth indicator field may correspond to a PUCCH resource indicator field in DCI Format 1-0 and/or Format 1-1 in some approaches, and is not used to indicate the PUCCH resource.

In the foregoing manner, indicator fields in DCI signaling can be reduced, and signaling overheads can be reduced.

This is merely for understanding that a time domain resource is used as an example for description in this application. This application includes but is not limited this. Any manner in which the uplink data channel resource can be indicated by using the shared indicator field of the downlink data channel resource and the uplink data channel resource falls within the protection scope of this application.

In a representation form, the second indication information may indicate the uplink data channel resource in any one of the following manners:

Manner 1: The second indication information may include one or more of a first indicator field, a second indicator field, or a third indicator field in the DCI. The first indicator field is used to indicate a slot offset of the uplink data channel. The second indicator field is used to indicate transmit power of the uplink data channel. The third indicator field is used to indicate one or more items in a first set, and the first set includes one or more of a start symbol S and a length L of the uplink data channel on the time domain resource, an SLIV of the time domain resource, a mapping mode of a time-frequency resource, a quantity of repeated transmissions, an indication type of a frequency domain resource, a mapping mode of the frequency domain resource, a RIV of the frequency domain resource, a bitmap of the frequency domain resource, or a start RB and a quantity of occupied RBs of the frequency domain resource.

Specifically, the first indicator field is used to indicate the slot offset of the uplink data channel. The slot offset is a quantity of slots between a slot in which the downlink control channel is received and a slot in which a PUSCH corresponding to the downlink control channel is received, that is, may be k2 described above; or may be a quantity of slots between a slot in which a PDSCH is scheduled and a slot in which a PUSCH is scheduled, where the PDSCH and the PUSCH are scheduled by a same downlink control channel.

Specifically, the second indicator field is used to indicate the transmit power of the PUSCH. For example, as shown in Table 1, two bits (bits) are used as an example. The TPC command for scheduled PUCCH may be used to indicate a value in a transmit power control command field, for example, 00. In this case, it may be learned, according to Table 1, that the transmit power is P0.

| Transmit power control command field (TPC Command Field) | Transmit power of the PUSCH |
| --- | --- |
| 00 | P0 |
| 01 | P1 |
| 10 | P2 |
| 11 | P3 |

P0, P1, P2, and P3 may be used to represent absolute values of the transmit power of the PUSCH, or may be accumulated values used to adjust the transmit power of the PUSCH.

Specifically, the transmit power of the PUSCH is calculated by using the following formula:

$$P_{PUSCH,b,f,c}(i, j, q_d, l) = \min \begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{cases},$$

where $P_{PUSCH,b,f,c}$ (i, j, $q_d$, l) represents the transmit power of the PUSCH, $P_{O\_PUSCHb,f,c}(j)$ and $\Delta_{TF,b,f,c}(i)$ are parameters configured by higher layers, $P_{CMAXf,c}(i)$ represents maximum output power of the terminal device, $\alpha_{b,f,c}(j)$ represents a path loss compensation factor, $M_{RB,b,f,c}^{PUSCH}(i)$ represents a quantity of RBs occupied by the PUSCH, $PL_{b,f,c}(q_d)$ represents a downlink loss, and $f_{b,f,c}(i,l)$ represents a power adjustment state of the PUSCH and may be:

$$f_{b,f,c}(i, l) = f_{b,f,c}(i - i_0, l) + \sum_{m=0}^{C(D_i)-1} \delta_{PUSCH,b,f,c}(m, l) \quad \text{(Formula 1)}$$

or $$f_{b,f,c}(i, l) = \delta_{PUSCH,b,f,c}(i, l) \quad \text{(Formula 2)}$$

$\delta_{PUSCHb,f,c}$ is the power value of the PUSCH indicated by the transmit power control command field. Formula 1 or Formula 2 may be selected by using higher layer signaling to calculate $f_{b,f,c}(i,l)$. If Formula 1 is used for calculation, P0, P1, P2, and P3 represent the accumulated values of the PUSCH; and if Formula 2 is used for calculation, P0, P1, P2, and P3 are the absolute values of the PUSCH.

Specifically, the third indicator field is used to indicate the one or more items in the first set. For example, the first set may include one or more of the SLIV of the time domain resource, the quantity S of start symbols and the quantity L of occupied symbols of the time domain resource, the mapping mode of the time domain resource, the quantity of repeated transmissions, the indication type of the frequency domain resource, the mapping mode of the frequency domain resource, the resource indicator value RIV of the frequency domain resource, the start RB and the quantity of occupied RBs of the frequency domain resource, or the bitmap of the frequency domain resource.

For example, in an implementation, the first set may be a ninth resource table, each row in the ninth resource table includes one index value and the one or more items in the first set, or each row includes the one or more items in the first set, and the third indicator field is used to indicate an index of a row in the ninth resource table or indicate a row in the ninth resource table.

For example, the ninth resource table may be semi-persistently configured by using higher layer signaling.

For example, the first indicator field may be a PDSCH-to-HARQ_feedback timing indication information (PDSCH-to-HARQ_feedback timing indicator) field, the second indicator field may be a power command for scheduled PUCCH (TPC command for scheduled PUCCH) indicator field, and the third indicator field is a PUCCH resource indication information (PUCCH resource indicator) field.

Manner 2: The second indication information includes one or more of a first indicator field, a second indicator field, or a third indicator field in the downlink control information DCI, information about a bit occupied by the one or more of the first indicator field, the second indicator field, or the third indicator field is used to indicate the uplink data channel resource, and the uplink data channel resource includes at least one of a time domain resource, a frequency domain resource, or transmit power.

For example, one or more of the first indicator field, the second indicator field, or the third indicator field occupy N bits in total, and N is a positive integer. In this case, the N bits are used to indicate the uplink data channel resource. Specifically, the uplink data channel resource may include one or more of the time domain resource, the frequency domain resource, or the transmit power of the PUSCH.

For example, the time domain resource may include one or more of an SLIV of the time domain resource, a mapping mode of the time domain resource, a quantity of repeated transmissions, a start symbol S and a length L of the uplink data channel on the time domain resource, the mapping mode of the time domain resource, or the quantity of repeated transmissions. This is merely an example for understanding this application, and this application includes but is not limited this.

For another example, the frequency domain resource may include one or more of an indication type of the frequency domain resource, a mapping mode of the frequency domain resource, a resource indicator value RIV of the frequency domain resource, a start RB and a quantity of occupied RBs of the frequency domain resource, or a bitmap of the frequency domain resource. This is merely an example for understanding this application, and this application includes but is not limited this.

For example, to better understand the technical solution in this embodiment of the present disclosure, Manner 2 may be reflected in a form of a tenth resource table. Each row in the tenth resource table may include a bit index and the uplink data channel resource, and the uplink data channel resource includes at least one of the time domain resource, the frequency domain resource, or the transmit power. The second indication information may be used to indicate the bit index of the row in the second resource information. Alternatively, each row in the tenth resource table may include the uplink data channel resource, and the second indication information may be used to indicate a row in the tenth resource table.

For example, the tenth resource table may be semi-persistently configured by using higher layer signaling.

For example, the first indicator field may be a PDSCH-to-HARQ_feedback timing indicator field, the second indicator field may be a TPC command for scheduled PUCCH indicator field, and the third indicator field is a PUCCH resource indicator field.

Manner 3: The second indication information includes one or more of a first indicator field, a second indicator field, or a third indicator field in downlink control information DCI. The first indicator field is used to indicate information about a time domain resource of the uplink data channel. The second indicator field is used to indicate information about a frequency domain resource of the uplink data channel. The third indicator field is used to indicate transmit power.

For example, the information about the time domain resource includes one or more of a slot offset, an SLIV of the time domain resource, a start symbol S and a length L of occupied symbols of the time domain resource, a time domain mapping mode, or a quantity of time domain repetitions. The slot offset may be a quantity of slots between a slot in which the downlink control channel is received and a slot in which a PUSCH corresponding to the downlink control channel is received, that is, may be k2 described above; or may be a quantity of slots between a slot in which a PDSCH is scheduled and a slot in which a PUSCH is scheduled, where the PDSCH and the PUSCH are scheduled by a same downlink control channel.

For example, the information about the time domain resource may be reflected in an eleventh resource table, each row in the eleventh resource table includes one index value and one or more items included in the information about the time domain resource in Manner 3, and the first indicator field is used to indicate an index of a row in the eleventh resource table. For another example, each row in the eleventh resource table includes one or more items of the information about the time domain resources, and the first indicator field is used to indicate a row in the eleventh resource table.

For example, the frequency domain resource may include one or more of an indication type of the frequency domain resource, a mapping mode of the frequency domain resource, a resource indicator value RIV of the frequency domain resource, a start RB and a quantity of occupied RBs of the frequency domain resource, or a bitmap of the frequency domain resource. This is merely an example for understanding this application, and this application includes but is not limited this.

For example, the information about the frequency domain resource may be represented by using a bitmap (bitmap). Each resource block group (RBG) corresponds to one bit. If an RBG is allocated to the terminal device, a corresponding bit in the bitmap is set to 0 or 1; otherwise, the corresponding bit is set to 1 or 0.

For example, the information about the frequency domain resource may be reflected in a twelfth resource table, each row in the twelfth resource table includes one index value and one or more items included in the information about the frequency domain resource in Manner 3, and the second indicator field is used to indicate an index of a row in the twelfth resource table. For another example, each row in the twelfth resource table includes one or more items of the information about the time domain resources, and the first indicator field is used to indicate a row in the twelfth resource table.

For example, the transmit power, of the PUSCH, indicated by the third indicator field may be an offset for power adjustment, or may be a linear value, or may be a dB value. In a representation form, the transmit power may be reflected in a thirteenth resource table, each row in the thirteenth resource table includes one index value and transmit power, and the third indicator field is used to indicate an index of a row in the thirteenth resource table. For another example, each row in the thirteenth resource table includes one or more items of the information about the time domain resources, and the first indicator field is used to indicate a row in the thirteenth resource table.

For example, the eleventh resource table, the twelfth resource table, and the thirteenth resource table may be semi-persistently configured by using higher layer signaling.

For example, the higher layer signaling may be radio resource control (RRC) signaling, or a media access control (MAC) control element (CE). This may be specifically determined according to a protocol agreement and an actual scenario, and is not limited herein.

For example, the first indicator field may be a PDSCH-to-HARQ_feedback timing indicator field, the second indicator field may be a PUCCH resource indicator field, and the third indicator field is a TPC command for scheduled PUCCH indicator field.

In the technical solution of Manner 1, Manner 2, or Manner 3, a PUSCH resource and a PDSCH resource are indicated by using one piece of signaling. Compared with some approaches in which PUSCH scheduling and PDSCH indication are performed by using two pieces of signaling, this manner can reduce scheduling signaling overheads, reduce a communication latency, and ensure service quality.

For example, the DCI carried on the downlink control channel in S201 and S202 is not used to indicate an uplink control channel.

For example, the DCI carried on the downlink control channel does not include one or more of the fourth indicator field, the fifth indicator field, or the sixth indicator field. The fourth indicator field is used to indicate K1, namely, the slot offset from the PDSCH to the PUCCH that feeds back the ACK/NACK and that corresponds to the PDSCH. The fifth indicator field is used to indicate the transmit power of the PUCCH. The sixth indicator field is used to indicate the PUCCH resource. In the foregoing manner, indicator fields in DCI signaling can be reduced, and signaling overheads can be reduced. For example, the fourth indicator field corresponds to the PDSCH-to-HARQ_feedback timing indicator field in DCI Format 1-0 and/or Format 1-1 in some approaches; the fifth indicator field corresponds to the TPC command for scheduled PUCCH indicator field in DCI Format 1-0 and/or Format 1-1 in some approaches; and the sixth indicator field corresponds to the PUCCH resource indicator field in DCI Format 1-0 and/or Format 1-1 in some approaches.

It can be learned from the foregoing that, in this embodiment of this application, the terminal device obtains the indication information on the downlink control channel, where the indication information is used to indicate the downlink data channel resource and the downlink data channel resource; and communicates with the network device by using the downlink data channel resource and the uplink data channel resource. The terminal device obtains, through calculation, a required frequency resource size by using the association relationship between the uplink data and the downlink data, to save resource size indication information in the control signaling, and reduce control signaling overheads.

In the foregoing embodiments provided in this application, the methods provided in embodiments of this application are separately described from a perspective of the network device, the terminal device, and interaction between the network device and the terminal device. To implement the functions in the methods provided in embodiments of this application, the network device and the terminal device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 8:
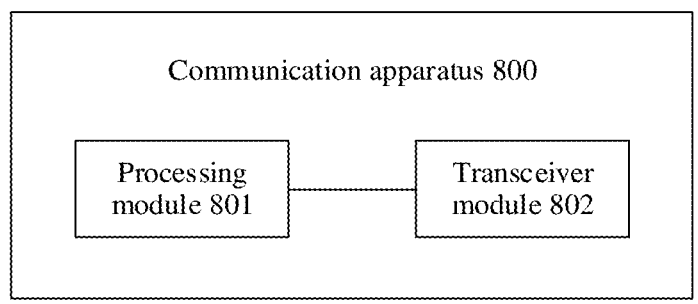
FIG. 8 is a schematic diagram of a communication apparatus 800 according to at least an embodiment of this application.
Figure 9:
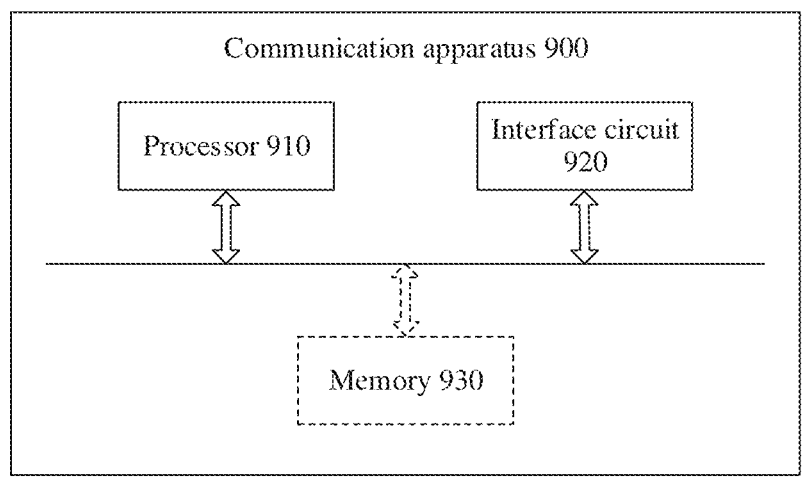
FIG. 9 is a schematic diagram of a communication apparatus 900 according to at least an embodiment of this application.

FIG. 8 and FIG. 9 are schematic diagrams of structures of possible communication apparatuses according to embodiments of this application. These communication apparatuses can implement functions of the terminal device or the network device in the foregoing method embodiments, and therefore can also implement beneficial effects of the foregoing method embodiments. In embodiments of this application, the communication apparatus may be the terminal device 110 shown in FIG. 1, or may be the access network device 120 shown in FIG. 1, or may be a module (for example, a chip) used in the terminal device or the access network device.

As shown in FIG. 8, the communication apparatus 800 includes a processing module 801 and a transceiver module 802. The communication apparatus 800 may be configured to implement functions of the terminal device or the network device in the method embodiments shown in FIG. 2 to FIG. 7.

When the communication apparatus 800 is configured to implement the functions of the terminal device in the method embodiments in FIG. 2 to FIG. 7, the processing module 801 is configured to obtain indication information carried on a physical downlink control channel, where the indication information is used to indicate a downlink data channel resource and an uplink data channel resource. The transceiver module 802 is configured to receive data by using the downlink data channel resource and/or send data by using the uplink data channel resource.

When the communication apparatus 800 is configured to implement the functions of the network device in the method embodiments in FIG. 2 to FIG. 7, the processing module 801 is configured to determine indication information, where the indication information is used to indicate a downlink data channel resource and an uplink data channel resource. The transceiver module 802 is configured to send data by using the downlink data channel resource and/or receive data by using the uplink data channel resource.

As shown in FIG. 9, the communication apparatus 900 includes a processor 910 and an interface circuit 920. The processor 910 and the interface circuit 920 are coupled to each other. It may be understood that the interface circuit 920 may be a transceiver or an input/output interface. In some embodiments, the communication apparatus 900 may further include a memory 930, configured to store instructions executed by the processor 910, input data required by the processor 910 to run the instructions, or data generated after the processor 910 runs the instructions.

When the communication apparatus 900 is configured to implement the methods in the foregoing method embodiments, the processor 910 is configured to perform a function of the processing module 801, and the interface circuit 920 is configured to perform a function of the transceiver module 802.

For beneficial effects of the apparatuses shown in FIG. 8 and FIG. 9, refer to the effects in the foregoing method embodiments. Details are not described herein again.

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be further a component of the processor. The processor and the storage medium may be located in an ASIC. In addition, the ASIC may be located in an access network device or the terminal device. Certainly, the processor and the storage medium may exist in the access network device or the terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedure or functions according to embodiments of this application are implemented. The computer may be a general-purpose computer, a dedicated computer, a computer network, or other programmable apparatuses. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, the term "at least one" means one or more, and the term "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. In the text descriptions of this application, the character "/" usually indicates an "or" relationship between the associated objects. In a formula in this application, the character "/" indicates a "division" relationship between the associated objects.

It may be understood that various numbers in embodiments of this application are merely used for distinguishing for ease of description, and are not used to limit the scope of embodiments of this application. The sequence numbers of the foregoing processes do not mean an execution sequence, and the execution sequence of the processes should be determined according to functions and internal logic of the processes.

What is claimed is:

1. A data transmission method, comprising:
   obtaining indication information included on a downlink control channel, wherein the indication information is useable to indicate a downlink data channel resource and an uplink data channel resource; and
   at least one of:
      receiving data by the downlink data channel resource; or
      sending data by the uplink data channel resource,
   wherein the downlink data channel resource and the uplink data channel resource have a correspondence.

2. The method according to claim 1, wherein the downlink data channel resource and the uplink data channel resource have the correspondence comprises:
   the downlink data channel resource and the uplink data channel resource sharing an indicator field.

3. The method according to claim 1, wherein the obtaining indication information on the downlink control channel comprises:
   obtaining first indication information and second indication information on the downlink control channel, wherein the first indication information is useable to indicate the downlink data channel resource, and the second indication information is useable to indicate the uplink data channel resource.

4. The method according to claim 3, wherein the second indication information comprises one or more of:
   a first indicator field,
   a second indicator field, or
   a third indicator field in downlink control information (DCI), wherein
      the first indicator field is useable to indicate a slot offset of an uplink data channel;
      the second indicator field is useable to indicate a transmit power of the uplink data channel; and
      the third indicator field is useable to indicate one or more of:
         a start symbol(S) and a length (L) of the uplink data channel on a time domain resource,
         a start and length indicator value (SLIV) of the time domain resource,
         a mapping mode of the time domain resource,
         a quantity of repeated transmissions,
         an indication type of a frequency domain resource,
         a mapping mode of the frequency domain resource,
         a resource indicator value (RIV) of the frequency domain resource,
         a start resource block (RB) and a quantity of occupied RBs of the frequency domain resource, or
         a bitmap of the frequency domain resource.

5. The method according to claim 1, wherein the uplink data channel resource comprises a physical uplink shared channel (PUSCH).

6. A data transmission method, comprising:
   sending indication information on a downlink control channel, wherein the indication information is useable to indicate a downlink data channel resource and an uplink data channel resource; and
   at least one of:
      sending data by the downlink data channel resource; or
      receiving data by the uplink data channel resource,
   wherein the downlink data channel resource and the uplink data channel resource have a correspondence.

7. The method according to claim 6, wherein the downlink data channel resource and the uplink data channel resource have the correspondence comprises:
   the downlink data channel resource and the uplink data channel resource sharing an indicator field.

8. The method according to claim 6, wherein the sending the indication information on the downlink control channel comprises:
   sending first indication information and second indication information on the downlink control channel, wherein the first indication information is useable to indicate the downlink data channel resource, and the second indication information is useable to indicate the uplink data channel resource.

9. The method according to claim 8, wherein the second indication information comprises one or more of:
   a first indicator field,
   a second indicator field, or
   a third indicator field in downlink control information (DCI), wherein
      the first indicator field is useable to indicate a slot offset of an uplink data channel;
      the second indicator field is useable to indicate a transmit power of the uplink data channel; and
      the third indicator field is useable to indicate one or more of:
         a start symbol(S) and a length (L) of the uplink data channel on a time domain resource,
         a start and length indicator value (SLIV) of the time domain resource,
         a mapping mode of the time domain resource,
         a quantity of repeated transmissions,
         an indication type of a frequency domain resource,
         a mapping mode of the frequency domain resource,
         a resource indicator value (RIV) of the frequency domain resource,
         a start resource block (RB) and a quantity of occupied RBs of the frequency domain resource, or
         a bitmap of the frequency domain resource.

10. A communication apparatus, comprising:
a processor configured to obtain indication information included on a downlink control channel, wherein the indication information is useable to indicate a downlink data channel resource and an uplink data channel resource; and
a transceiver, configured to at least one of:
receive data by the downlink data channel resource; or
send data by the uplink data channel resource,
wherein the downlink data channel resource and the uplink data channel resource have a correspondence.

11. The apparatus according to claim 10, wherein the downlink data channel resource and the uplink data channel resource have the correspondence comprises:
the downlink data channel resource and the uplink data channel resource sharing an indicator field.

12. The apparatus according to claim 10, wherein the processor being configured to obtain indication information included on the downlink control channel comprises the processor being configured to:
obtain first indication information and second indication information on the downlink control channel, wherein the first indication information is useable to indicate the downlink data channel resource, and the second indication information is useable to indicate the uplink data channel resource.

13. The apparatus according to claim 12, wherein the second indication information comprises one or more of:
a first indicator field,
a second indicator field, or
a third indicator field in downlink control information (DCI), wherein
the first indicator field is useable to indicate a slot offset of an uplink data channel;
the second indicator field is useable to indicate a transmit power of the uplink data channel; and
the third indicator field is useable to indicate one or more of:
a start symbol(S) and a length (L) of the uplink data channel on a time domain resource,
a start and length indicator value (SLIV) of the time domain resource,
a mapping mode of the time domain resource,
a quantity of repeated transmissions,
an indication type of a frequency domain resource,
a mapping mode of the frequency domain resource,
a resource indicator value (RIV) of the frequency domain resource,
a start resource block (RB) and a quantity of occupied RBs of the frequency domain resource, or
a bitmap of the frequency domain resource.

14. A communication apparatus, comprising:
a processor;
a transceiver configured to:
send indication information on a downlink control channel, wherein the indication information is useable to indicate a downlink data channel resource and an uplink data channel resource; and
at least one of:
send data by the downlink data channel resource; or
receive data by the uplink data channel resource,
wherein the downlink data channel resource and the uplink data channel resource have a correspondence.

15. The apparatus according to claim 14, wherein the downlink data channel resource and the uplink data channel resource have the correspondence comprises:
the downlink data channel resource and the uplink data channel resource sharing an indicator field.

16. The apparatus according to claim 14, wherein the transceiver configured to send the indication information on the downlink control channel comprises the transceiver being configured to:
send first indication information and second indication information on the downlink control channel, wherein the first indication information is useable to indicate the downlink data channel resource, and the second indication information is useable to indicate the uplink data channel resource.

17. The apparatus according to claim 16, wherein the second indication information comprises one or more of:
a first indicator field,
a second indicator field, or
a third indicator field in downlink control information (DCI), wherein
the first indicator field is useable to indicate a slot offset of an uplink data channel;
the second indicator field is useable to indicate a transmit power of the uplink data channel; and
the third indicator field is useable to indicate one or more of:
a start symbol(S) and a length (L) of the uplink data channel on a time domain resource,
a start and length indicator value (SLIV) of the time domain resource,
a mapping mode of the time domain resource,
a quantity of repeated transmissions,
an indication type of a frequency domain resource,
a mapping mode of the frequency domain resource,
a resource indicator value (RIV) of the frequency domain resource,
a start resource block (RB) and a quantity of occupied RBs of the frequency domain resource, or
a bitmap of the frequency domain resource.

* * * * *